United States Patent [19]

Ringe

[11] 4,085,966
[45] Apr. 25, 1978

[54] DOOR HEADER CONSTRUCTION
[75] Inventor: Stephen J. Ringe, Detroit, Mich.
[73] Assignee: Fruehauf Corporation, Detroit, Mich.
[21] Appl. No.: 738,851
[22] Filed: Nov. 4, 1976
[51] Int. Cl.[2] .................................. B60J 1/00
[52] U.S. Cl. ...................... 296/146; 49/495
[58] Field of Search ............ 296/154, 146, 28 R; 49/476, 485, 495

[56] References Cited
U.S. PATENT DOCUMENTS

| 3,198,572 | 8/1965 | Stolarczyk | 49/476 |
| 4,026,598 | 5/1977 | Koike | 296/146 |

*Primary Examiner*—Philip Goodman
*Attorney, Agent, or Firm*—Harness, Dickey & Pierce

[57] ABSTRACT

A combination door header and rain gutter for a trailer is disclosed. A generally U-shaped section having vertically oriented leg portions of different height extends across the top of a door opening of the trailer. A substantially Z-shaped closure member is secured to the upper edges of the leg portions on the U-shaped section. The forward portion of the Z-shaped member defines a rain gutter and provides for attachment of the roof skin of the vehicle and the rearward end of the Z-shaped member forms a drip cap.

7 Claims, 4 Drawing Figures

U.S. Patent — April 25, 1978 — 4,085,966
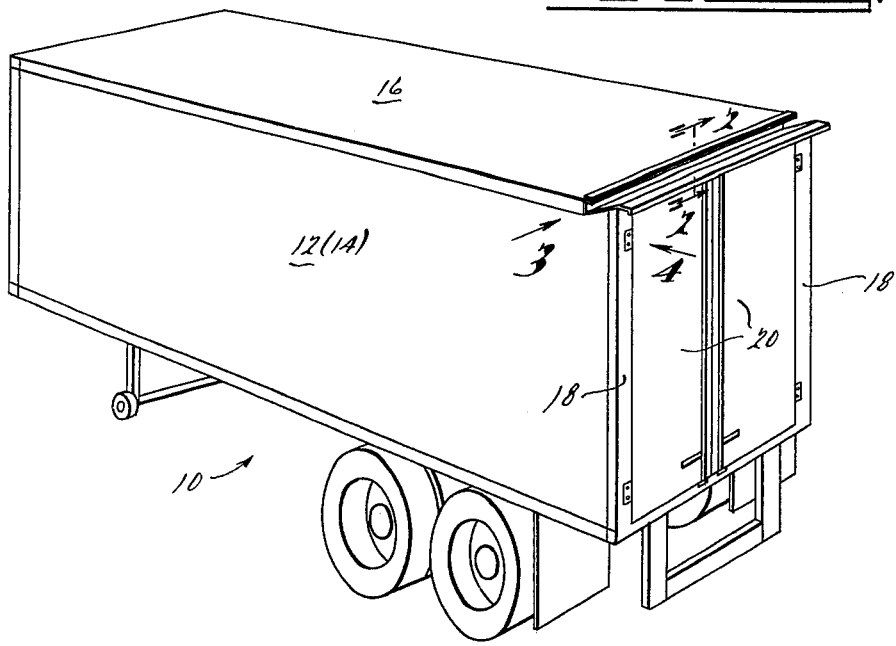
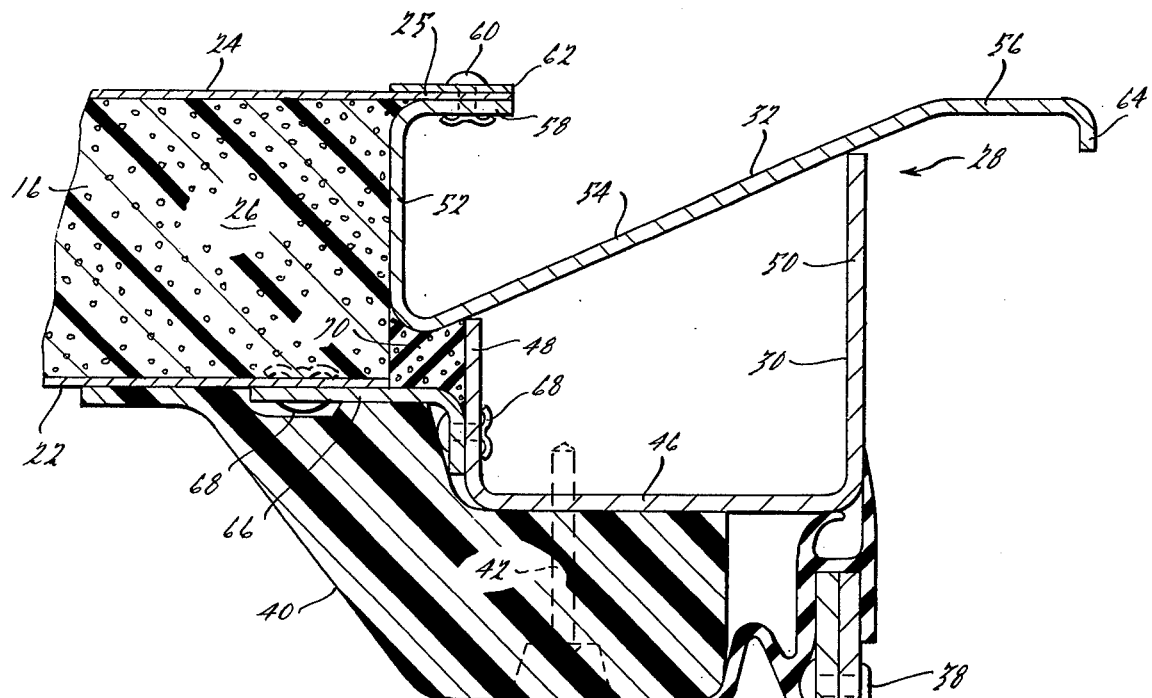
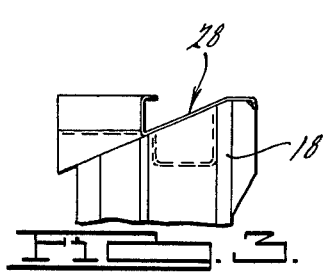
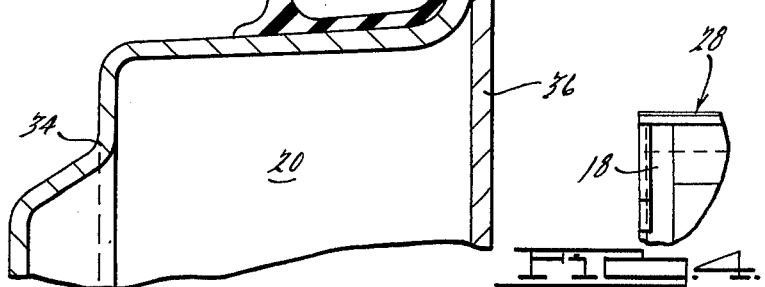

DOOR HEADER CONSTRUCTION

BACKGROUND AND SUMMARY OF THE INVENTION

The present invention relates to an improved combination door header and rain gutter for over-the-road trailers and other vehicles. Door header and rain gutter constructions heretofore used in such trailers and vehicles are generally bulky and necessarily extend a significant distance below the roof panel of the vehicle reducing head room and door opening area.

Accordingly, an object of the present invention is to provide a combined door header and rain gutter construction which maximizes head room and door opening height in the trailer or other vehicle. Another object of the present invention is to provide a combination door header and rain gutter of minimum height and yet with sufficient structural strength for meeting all of the load and use requirements of the trailer or other vehicle.

The above objects are achieved in accordance with the present invention which has a generally Z-shaped closure member welded to the top of a generally U-shaped section. The U-shaped section extends laterally across the door opening of the trailer or other vehicle at the top thereof. The outer leg of the U-shaped section is longer than the inner leg thereof and the Z-shaped closure member is secured across the upper ends of the leg portions. The closure member has an upwardly extending flange at the inner end thereof defining a rain gutter. The upwardly extending flange has an outwardly extending edge portion at the top thereof for attachment of the roof skin of the vehicle. The web of the closure member extends outwardly at an inclined angle and has an outer edge portion generally horizontally aligned with the outwardly extending edge portion of the flange. The end of the outer edge portion is turned downwardly to form a drip cap which is spaced at a significant distance from the outer and longer leg of the U-shaped member.

Other objects, features and advantages of the present invention will become apparent upon consideration of the following description taken in conjunction with the accompanying drawings.

BRIEF DESCRIPTION OF THE DRAWINGS

FIG. 1 illustrates an over-the-road trailer or other vehicle utilizing the present invention; and FIG. 2 is a cross-sectional view of the present invention viewed in the direction of the arrows 2—2 of FIG. 1; and FIG. 3 is a view taken in the direction of the arrow 3 of FIG. 1; and FIG. 4 is a view taken in the direction of the arrow 4 in FIG. 1.

DESCRIPTION OF THE PREFERRED EMBODIMENTS

As shown in FIG. 1, the present invention is adapted to be utilized in an over-the-road trailer or other vehicle 10. The trailer 10 has a side wall 12, a front wall (not shown), a roof 16, a pair of rear vertical posts 18 which frame a pair of rear doors 20. The roof member 16 can be of any conventional type, but as shown in FIG. 2, is of the foam-filled type having an inner skin 22, an outer skin 24, and an integral structural foam center 26 sandwiched between the skins 22 and 24. The outer skin 24 has a rear edge portion 25 for attachment to and connection with a header 28 of the present invention, as will be described.

The combination rear door header and rain gutter assembly 28 of the present invention is best shown in FIG. 2 and comprises a U-shaped section 30 having a generally Z-shaped upper closure member 32. The header 28 is adapted to be welded to the upper extremities of the rear posts 18.

The doors 20 of the trailer 10 are positioned immediately beneath the header 28, the lower surface of the header 28 defining the upper extremity of the door opening. Each of the doors 20 has an inner skin 34 and an outer skin 36 which are secured together as by rivets 38 or other appropriate fastening means. A door stop member 40 is attached to the lower surface of the header 28 by one or more bolts 42. A seal 44 is provided on the upper edge of each of the doors 20 so that when the doors 20 are closed, the seal 44 engages the stop 40 as well as the header 28 to seal the interior of the trailer 10. The stop 40 and seal member 44 are generally made from an elastomeric material.

In accordance with the present invention, the header 28 comprises the U-shaped section 30 which has a horizontal bight portion 46 and a pair of vertically extending leg portions 48 and 50. The outer leg portion 50 of the section 30 has a greater vertical dimension than the inner leg portion 48.

Positioned on top of the U-shaped section 30 is a generally Z-shaped closure member 32 comprising a vertically extending flange 52 at the inner edge thereof, an upwardly inclined web section 54 in the center thereof, and a horizontally extending flange member 56 at the rearward edge thereof. The sections 52 and 54 of the member 32 define a rear rain gutter for the trailer 10. Thus, rain which flows rearwardly over the roof 16 of the trailer 10 will fall into the gutter formed by the sections 52 and 54 and be directed laterally to the sides of the trailer rather than being allowed to flow freely down the doors 20 of the trailer where it might leak into the trailer damaging the contents thereof, or render loading and unloading of the trailer inconvenient.

At the upper end of the flange section 52 of the closure member 32, an outwardly extending edge portion 58 is provided for attachment of the rear edge 25 of roof skin 24 by means of rivets or other fastening means 60. A cap strip 62 is typically provided to strengthen the joint between the skin 24 and the edge portion 58.

The outer end 56 of the closure member 32 is generally horizontally oriented and is aligned with the outwardly extending edge portion 58. A terminal edge portion 64 of the closure member 32 is turned downwardly to form a drip cap. The drip cap 64 is positioned outwardly from the doors 20. In this manner, water or other debris not entering the rain gutter will also not be allowed to drip or fall along the surface of the doors 20 where it might adversely affect the contents of the trailer or other vehicle 10. The drip cap 64 is particularly important when the trailer 10 is being loaded or unloaded and the doors 20 are open.

The U-shaped section 30 and Z-shaped closure member 32 are securely attached together in the position shown in FIG. 2 by welding. Since the intermediate section 54 of the member 32 has a significant horizontal dimension, it provides a balanced weld point for the upper extremity of the rear posts 18. It is to be noted that the posts 18 close out the member 32. In addition, an attachment flange 66 is welded to the header 28 for connection of the roof member 16 to the header 28.

Appropriate fastening means, such as rivets 68, are utilized to secure the roof member 16 to the attachment flange 66. Filler or insulation 70 can be provided in the space formed between the header 28, roof member 16, and flange 66.

The present invention provides an improved combination door header and rain gutter assembly of minimum height measured from the top of the roof member 16 to the top of the door opening, yet still provides the necessary structural strength required in heavy duty over-the-road trailers and trucks.

While specific embodiments of the present invention have been illustrated and described in the foregoing specification and accompanying drawings, it is understood that the invention is not limited to the exact construction shown, but that various alterations in the construction and arrangement of parts are possible without departing from the spirit and scope of the invention as more particularly defined by the following claims.

What is claimed is:

1. A combination door header and rain gutter comprising a generally U-shaped member having vertically extending inner and outer leg portions connected by a horizontal bight portion, said outer leg portion having a greater vertical dimension than said inner leg portion, and a second member secured to the ends of said leg portions, said second member having an upwardly rearwardly inclined central web portion, a vertical flange at the inner end thereof, and an outwardly extending generally horizontal flange at the outer end thereof, the central portion of said second member forming a closed box section with said U-shaped member to define said door header, the vertical flange and the central web portion of said second member defining said rain gutter.

2. The invention as defined in claim 1 wherein said upwardly extending flange on said second member has a rearwardly extending flange thereon for attachment of the roof of said vehicle.

3. The invention as defined in claim 2 wherein said rearwardly extending flange is substantially horizontally aligned with said outwardly extending flange on the outer end of said second member.

4. The invention as defined in claim 1 wherein said outwardly extending flange on said second member has a downwardly turned end portion thereon forming a drip cap.

5. The invention as defined in claim 4 wherein said drip cap is positioned outwardly from said outer leg portion of said first member.

6. The invention as defined in claim 1 wherein said bight portion extends across the door opening of said vehicle and defines the top of said opening thereof.

7. The invention as defined in claim 1 wherein said second member is generally Z-shaped.

* * * * *